(12) United States Patent     (10) Patent No.:   US 12,638,876 B2

Doglio     (45) Date of Patent:    May 26, 2026

---

(54) BASE COVER RELEASE MECHANISM

(71) Applicant: DELL PRODUCTS L.P., Round Rock, TX (US)

(72) Inventor: Jean Doglio, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 18/635,553

(22) Filed: Apr. 15, 2024

(65) Prior Publication Data

US 2025/0321613 A1     Oct. 16, 2025

(51) Int. Cl.
    G06F 1/16       (2006.01)

(52) U.S. Cl.
    CPC ..................................... G06F 1/16 (2013.01)

(58) Field of Classification Search
    CPC ........ G06F 1/16; G06F 1/1616; G06F 1/1656; G06F 1/1679
    See application file for complete search history.

(56) References Cited

U.S. PATENT DOCUMENTS

| | | | | |
|---|---|---|---|---|
| 6,997,635 | B2 * | 2/2006 | Liu | ......................... E05C 19/06 |
| | | | | 312/265.5 |
| 7,164,578 | B2 * | 1/2007 | Wang | ...................... G06F 1/162 |
| | | | | D14/315 |
| 7,789,437 | B2 * | 9/2010 | Sheng | ................... G06F 1/1658 |
| | | | | 292/145 |

| | | | | |
|---|---|---|---|---|
| 8,197,018 | B2 * | 6/2012 | Tang | ........................ G06F 1/181 |
| | | | | 292/259 R |
| 8,226,179 | B2 * | 7/2012 | Yang | ........................ H05K 5/15 |
| | | | | 312/265.5 |
| 8,926,345 | B2 * | 1/2015 | Kim | ................... G06K 13/0825 |
| | | | | 439/142 |
| 9,218,020 | B1 * | 12/2015 | Martinez | ............... G06F 1/1656 |
| 9,282,659 | B2 * | 3/2016 | Lee | .......................... H05K 5/03 |
| 9,603,272 | B2 * | 3/2017 | Yamaguchi | ........... G06F 1/1656 |
| 9,681,586 | B2 | 6/2017 | Bailey et al. | |
| 10,303,226 | B2 * | 5/2019 | Chen | ........................ G06F 1/186 |
| 10,743,431 | B2 * | 8/2020 | Shindo | .................. G06F 1/1656 |
| 10,932,380 | B2 * | 2/2021 | Huston | ................ H05K 5/0217 |
| 2011/0228455 | A1 * | 9/2011 | Dong | ..................... H05K 5/023 |
| | | | | 361/679.01 |
| 2013/0044420 | A1 * | 2/2013 | Iwamoto | ................. G06F 1/182 |
| | | | | 361/679.01 |
| 2015/0047262 | A1 * | 2/2015 | Lee | ........................ H05K 5/061 |
| | | | | 49/477.1 |
| 2019/0302852 | A1 * | 10/2019 | Kitamura | .............. G06F 3/0202 |

(Continued)

*Primary Examiner* — Rockshana D Chowdhury

(74) *Attorney, Agent, or Firm* — Larson Newman, LLP

(57) ABSTRACT

An information handling system includes a base portion and a lock bar. The base portion has first and second lock bar chassis supports. The first lock bar chassis support is located near a first edge of the base portion, and the second lock bar chassis support is located near a second edge of the base portion. The lock bar is in physical communication with the first and second lock bar chassis supports. The lock bar includes first and second heads. The first head is located at a first end of the lock bar and is in physical communication with the first lock bar chassis support when the lock bar is in a locked position. The second head is located at a second end of the lock bar and is in physical communication with the second lock bar chassis support when the lock bar is in an unlocked position.

20 Claims, 11 Drawing Sheets

(56)         References Cited

U.S. PATENT DOCUMENTS

| | | | |
|---|---|---|---|
| 2020/0387199 A1* | 12/2020 | Kinoshita | G06F 1/1616 |
| 2022/0394869 A1* | 12/2022 | Park | E05B 53/003 |
| 2024/0032233 A1 | 1/2024 | Alvarado et al. | |
| 2025/0273902 A1* | 8/2025 | Yokota | G06F 1/1654 |

* cited by examiner

BASE COVER RELEASE MECHANISM

FIELD OF THE DISCLOSURE

The present disclosure generally relates to information handling systems, and more particularly relates to a base cover release mechanism.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a base portion with first and second lock bar chassis supports. A first lock bar chassis support may be located near a first edge of the base portion, and a second lock bar chassis support may be located near a second edge of the base portion. The lock bar is in physical communication with the first and second lock bar chassis supports. The lock bar includes first and second heads. The first head is located at a first end of the lock bar and may be in physical communication with the first lock bar chassis support when the lock bar is in a locked position. The second head is located at a second end of the lock bar and may be in physical communication with the second lock bar chassis support when the lock bar is in an unlocked position.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
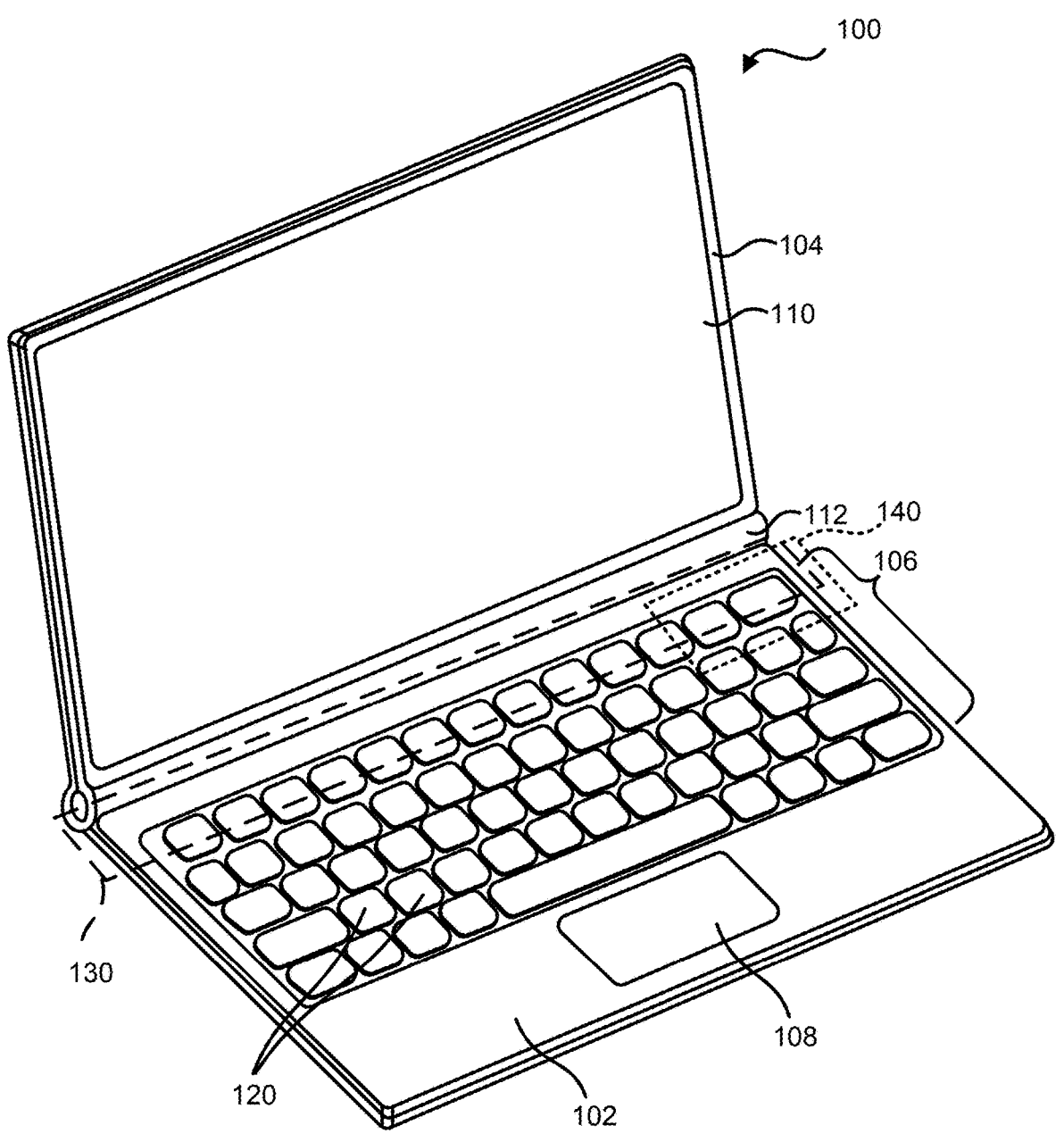
FIG. 1 is a perspective view of an information handling system according to at least one embodiment of the present disclosure.

FIG. 1 illustrates an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a base portion 102 and a top 104. Base portion 102 includes a keyboard 106 and a touchpad 108, and top portion 104 includes a display device 110. In an example, touchpad 108 may be any suitable pointing device. Base portion 102 is connected top portion 104 via a mechanism 112, such as one or more hinges. Keyboard 106 includes multiple keys 120. When the information handling system 100 comprises a 2-in-1 device, mechanism 112 may enable the top portion 104 to be connected to base portion 102 for use as a laptop device and may enable the top portion 104 to be detached from base portion 102 to enable the top portion 104 to be used as a tablet information handling system. Display device 110 may include one or more light emitting devices, such as, for example, light emitting diodes (LEDs), organic LED (OLED), liquid crystal display (LCD), another type of light emitting device, or any combination thereof. A portion 120 of information handling system 100 will be described in greater detail with respect to FIGS. 2 and 3 below, and a portion 130 of the information handling system will be described in greater detail with respect to FIGS. 8, 10, and 12-14 below.

Figure 2:
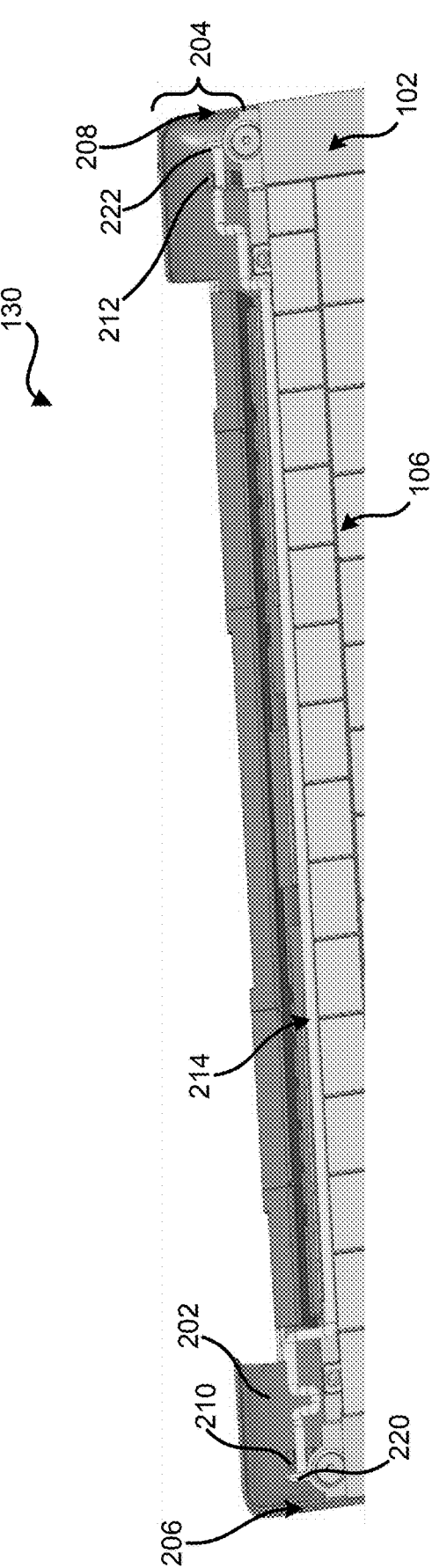
FIGS. 2 and 3 are diagrams of a section of a base portion in an information handling system according to at least one embodiment of the present disclosure.
Figure 3:
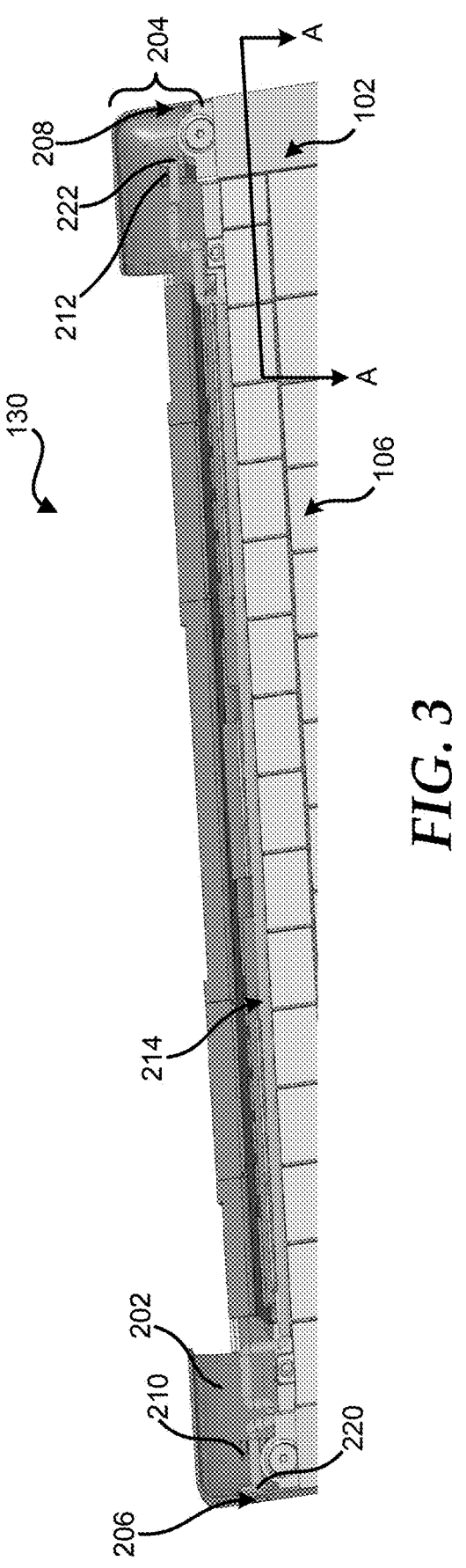

FIGS. 2 and 3 illustrate portion 120 information handling system 100 according to at least one embodiment of the present disclosure. Information handling system 100 includes a chassis base 202 of base portion 102 and a base cover section 204. Chassis base 202 includes key holes 206 and 208 and lock bar chassis supports 210 and 212. Information handling system 100 further includes a lock bar 214. Lock bar 214 includes heads 220 and 222. Chassis base 202 includes edges 230 and 232. Information handling system 100 and any components therein may include additional components without varying from the scope of this disclosure.

In an example, lock bar 214 may snap fit within lock bar chassis supports 210 and 212, which in turn may secure the lock bar with chassis base 202. While lock bar 214 is secured within lock bar chassis supports 210 and 212, the lock bar may be able to slide back and forth within chassis base 202. As lock bar 214 moves within chassis base 202, the lock bar may transition between a locked position and an unlocked position. In an example, an individual associated with information handling system 100 may push a tool, such as tool 504 of FIG. 5, through hole 206 in edge 230 and place the tool in physical communication with head 220 of lock bar 214. The individual may exert a force, via tool 504 of FIG. 5, on head 220, and this force may cause lock bar 214 to move or transition to the locked position.

Referring now to FIG. 2, when head 220 is in physical communication with lock bar chassis support 210, lock bar 214 may be in the locked position. When head 220 is in physical communication with lock bar chassis support 210, the head may be located further from edge 230 as compared to when lock bar 214 is in the unlocked position. Additionally, while lock bar 214 is in the locked position, head 222 may be located away from lock bar chassis support 212 and near edge 232. In an example, the individual may push a tool, such as tool 504 of FIG. 5, through hole 208 in edge 232 and place the tool in physical communication with head 222 of lock bar 214. The individual may exert a force, via tool 504 of FIG. 5, on head 222, and this force may cause lock bar 214 to move or transition to the unlocked position.

Referring now to FIG. 3, when head 222 is in physical communication with lock bar chassis support 212, lock bar 214 may be in the unlocked position. When head 222 is in physical communication with lock bar chassis support 212, the head may be located further from edge 232 as compared to when lock bar 214 is in the locked position. Additionally, while lock bar 214 is in the unlocked position, head 220 may be located away from lock bar chassis support 210 and near edge 230. A cross section of information handling system 100 taken along line A-A will be described with respect to FIG. 5 below.

Figure 4:
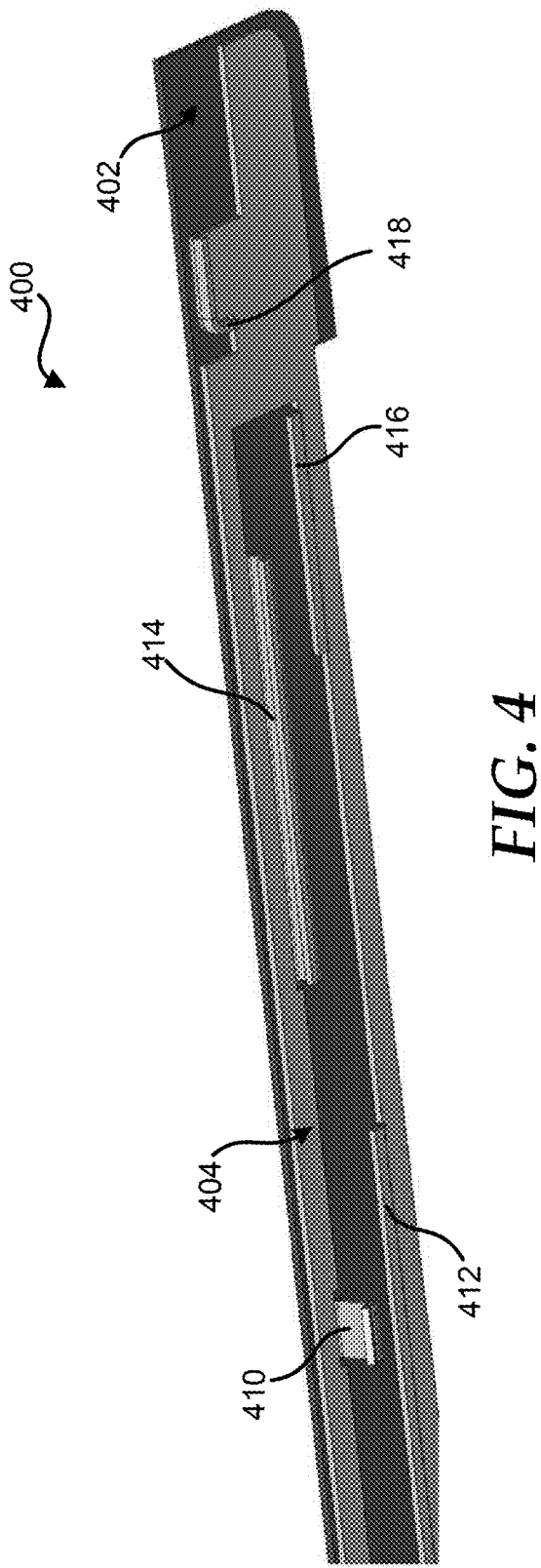
FIG. 4 is a diagram of a cover on a base portion in an information handling system according to at least one embodiment of the present disclosure.

FIG. 4 illustrates a base cover 400 associated with base cover section 204 of information handling system 100 in FIG. 2 according to at least one embodiment of the present disclosure. Base cover 400 includes a cosmetic piece 402 and a structural piece 404. Structural piece 404 includes hooks 410, 412, 414, and 416, and a stop 418. Base cover 400 may include additional components without varying from the scope of this disclosure.

In an example, when base cover 400 is in a closed position, hooks 410, 412, 414, and 416 may be placed in physical communication with different portions of a chassis base, such as chassis base 202 of FIG. 2. In this example, the physical communication between hooks 410, 412, 414, and 416 may prevent an individual from being able lift base cover 400 up from a chassis base, such as chassis base 202 of FIG. 2, as will be described with respect to FIGS. 8 and 9 below. When base cover 400 is in an open position, hooks 410, 412, 414, and 416 may not be placed in physical communication with different portions of a chassis base, such as chassis base 202 of FIG. 2. In this example, when base cover 400 is in the open position, an individual may be able lift the base cover up from a chassis base, such as chassis base 202 of FIG. 2, as will be described with respect to FIGS. 10-12 below.

In certain examples, when a lock bar, such as lock bar 214 of FIG. 2, is in a locked position, stop 408 may be in physical communication with the lock bar as will be described with respect to FIGS. 5 and 6 below. However, when a lock bar, such as lock bar 214 of FIG. 2, is in an unlocked position, stop 408 may not be in physical communication with the lock bar as will be described with respect to FIG. 7 below.

Figure 5:
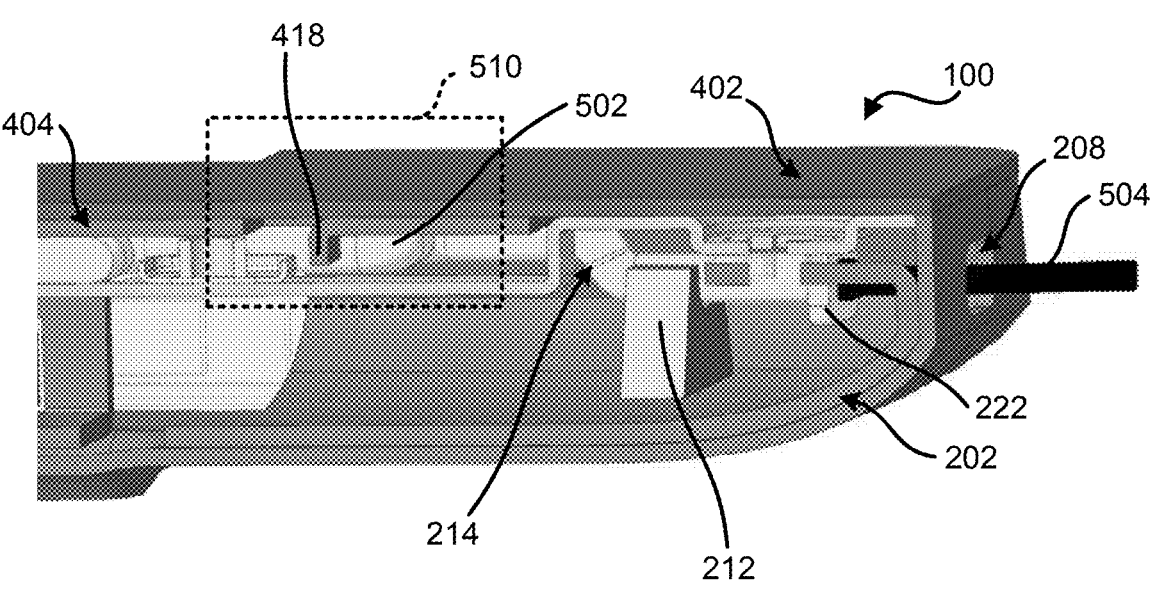
FIGS. 5-7 are cross-sectional views of a section of a base portion in an information handling system according to at least one embodiment of the present disclosure.
Figure 6:
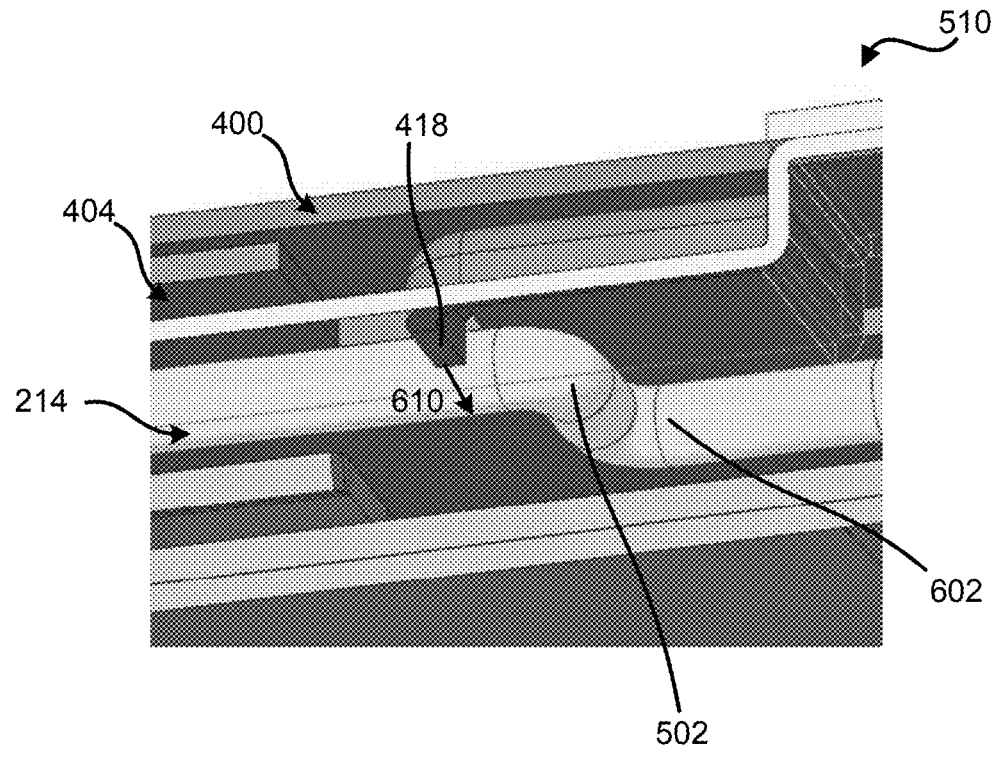
Figure 7:
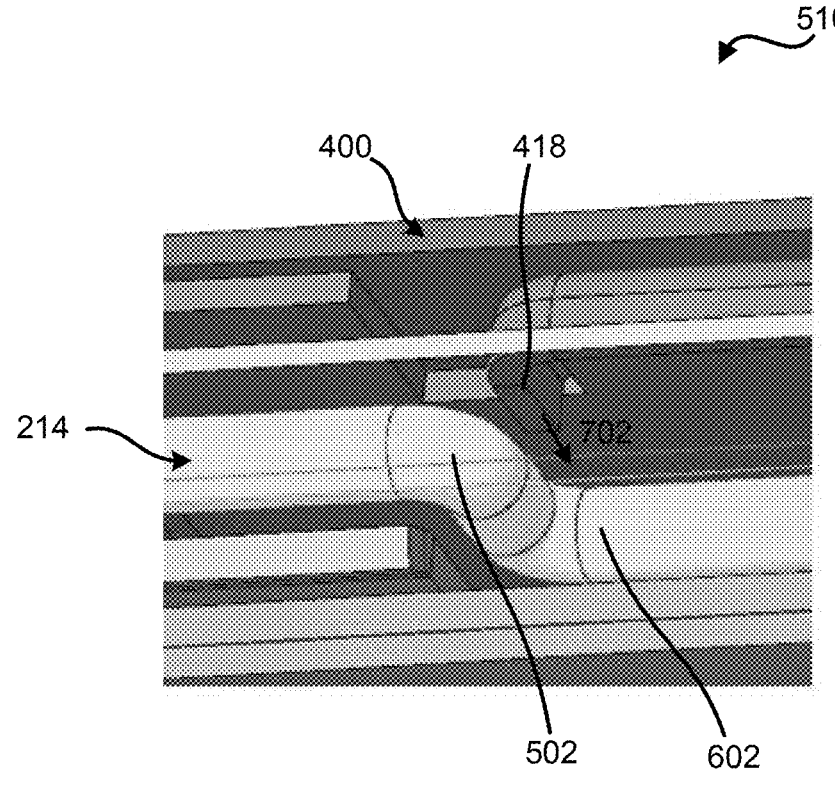

FIGS. 5-7 illustrates a portion of information handling system 100 according to at least one embodiment of the present disclosure. Lock bar 214 includes a locking portion 502. As illustrated in FIG. 5, cosmetic piece 402 of base cover 400 may be placed in physical communication with chassis base 202 and portions of structural piece 404 may be in physical communication with locking bar 214. For example, when locking bar 214 is in the locked position, locking portion 502 may be placed in physical communication with stop 418 of structural piece 404. In an example, locking bar 214 may be located within a saddle and slide along locking bar chassis support 212. Additional details of information handling system 100 located within section 510 will be illustrated in FIG. 6.

Referring now to FIG. 6, section 510 of information handling system 100 illustrates stop 418 in physical communication with locking portion 502. Locking bar 214 includes an unlocking portion 602, which may be substantially adjacent to locking portion 502. In an example, when stop 418 is in physical communication with locking portion 502, structural piece 404 may prevent base cover 400 from sliding in the direction of arrow 610.

Referring now to FIG. 7, lock bar 214 may be in an unlocked position, such that locking portion 502 is no longer in physical communication stop 418. In an example, lock bar 214 may transition from the locked position to the unlocked position in response to a force being exerted on a head of the lock bar by a tool, such as a force being exerted on head 222 by tool 504 in FIG. 5. When lock bar 214 is in the unlocked position, stop 418 may be substantially aligned with unlock portion 602 of the lock bar. In this situation, base cover 400 may slide in the direction of arrow 702, which may enable the base cover to transition from a closed position to an open position.

Figure 8:
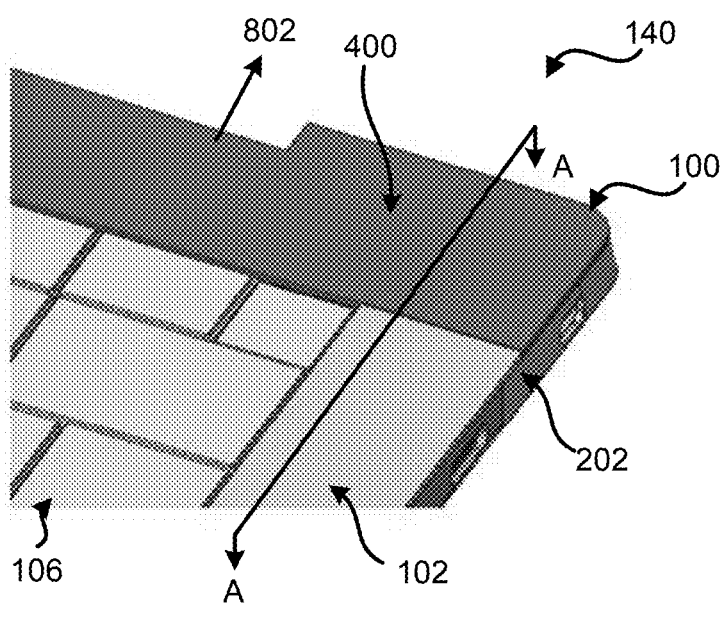
FIG. 8 is a diagram of a section of a base portion in an information handling system according to at least one embodiment of the present disclosure.

FIG. 8 illustrates section 140 of information handling system 100 with base cover 400 in a closed position according to at least one embodiment of the present disclosure. In an example, base cover 400 may be in the closed position. When base cover 400 is in the closed position, the base cover may be in physical communication with keyboard 106 and chassis base 202 of base portion 102. A cross section of information handling system 100 along line A-A is illustrated and described with respect to FIG. 9 below.

Figure 9:
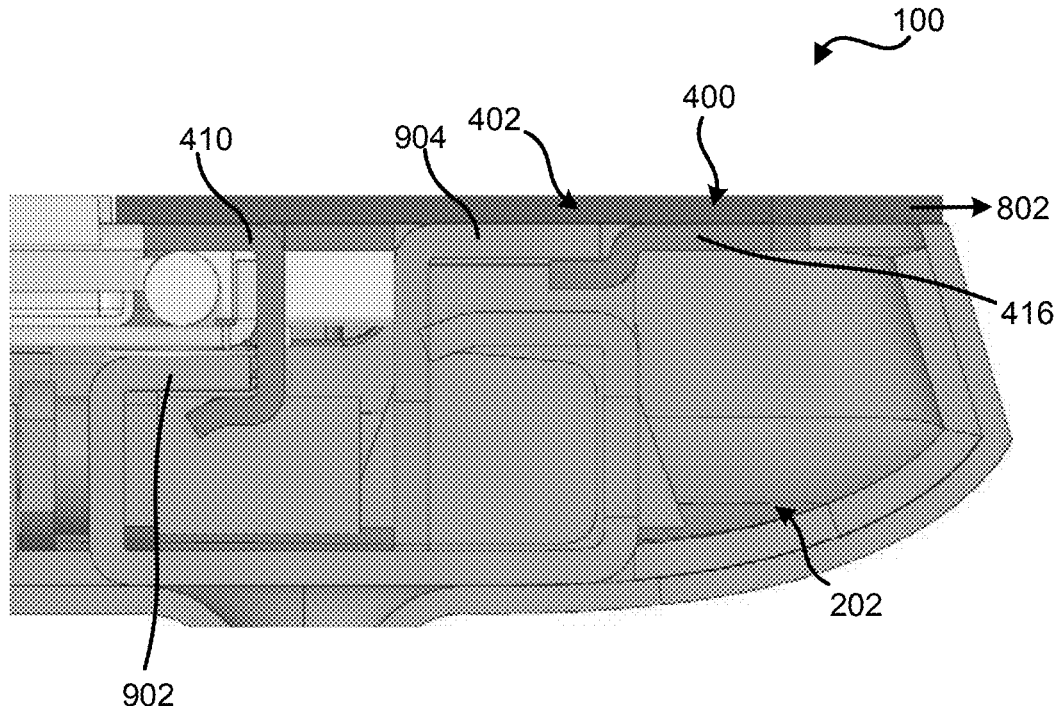
FIG. 9 is a cross-sectional view of a section of a base portion in an information handling system according to at least one embodiment of the present disclosure.

FIG. 9 illustrates a portion of information handling system 100 with base cover 400 in the closed according to at least one embodiment of the present disclosure. Information handling system 100 includes multiple latch components 902 and 904 and base cover 400. As stated above, when base cover 400 is in the closed position, cosmetic piece 402 may be placed in physical communication with chassis base 202. Additionally, when base cover 400 is in the closed position, hook 410 of structural piece 404 may be in physical communication with latch component 902 and hook 416 of the structural piece may be in physical communication with latch component 904. In an example, a portion hook 410 may be located below a portion of latch component 902 and a portion hook 416 may be located below a portion of latch component 904.

In certain examples, when base cover 400 is in the closed position, the location of hook 410 with respect to latch component 902 and the location of hook 416 with respect to latch component 904 may prevent base cover 400 from being lifted up off chassis base 202. In an example, base cover 400 may slide in the direction of arrow 802 as illustrated in FIGS. 8 and 9. In certain examples, as base cover 400 slides in the direction of arrow 802, the base cover may transition from the closed position to an open position.

Figure 10:
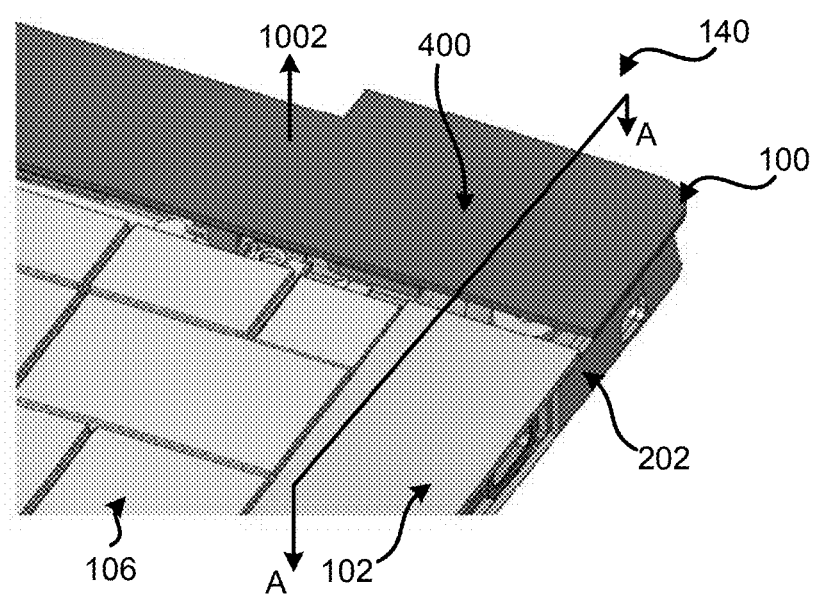
FIG. 10 is a diagram of a cover in a first open position on a base portion in an information handling system according to at least one embodiment of the present disclosure.

FIG. 10 illustrates portion 140 of information handling system 100 with base cover 400 in an open position according to at least one embodiment of the present disclosure. In an example, base cover 400 may be in the open position. When base cover 400 is in the open position, the base cover may be in physical communication chassis base 202 of base portion 102 but a gap may be located between keyboard 106 and the base cover. A cross section of information handling system 100 along line A-A is illustrated and described with respect to FIG. 11 below.

Figure 11:
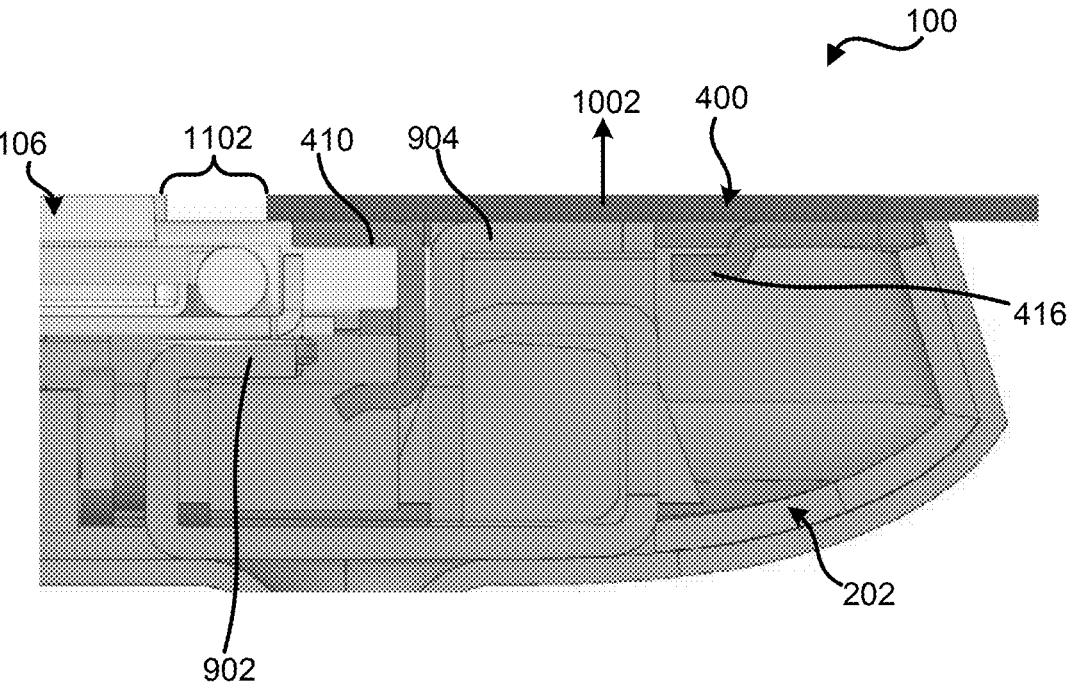
FIG. 11 is a cross-sectional view of the cover in the first open position according to at least one embodiment of the present disclosure.

FIG. 11 illustrates a portion of information handling system 100 with base cover 400 in the open according to at least one embodiment of the present disclosure. When base cover 400 is in the open position, cosmetic piece 402 may be placed in physical communication with chassis base 202 but hook 410 may not be in physical communication with attachment component 902 and hook 416 may not be in physical communication with attachment component 904. Additionally, when base cover 400 is in the open position, a gap 1102 may be formed or located between cosmetic piece 402 of base cover 400 and keyboard 106. In an example, gap 1102 may be large enough to enable an end of hook 410 to be beyond the end of attachment portion 902 and an end of hook 416 to be beyond an end of attachment portion 904 of chassis base 202.

In certain examples, when base cover 400 is in the open position, the location of hook 410 with respect to latch component 902 and the location of hook 416 with respect to latch component 904 may enable base cover 400 to be lifted up off chassis base 202. In an example, base cover 400 may lifted in the direction of arrow 1002 as illustrated in FIGS. 10 and 11. In certain examples, as base cover 400 is lifted in the direction of arrow 1002, the base cover may transition from the open position to a detached position as illustrated in FIG. 12.

Figure 12:
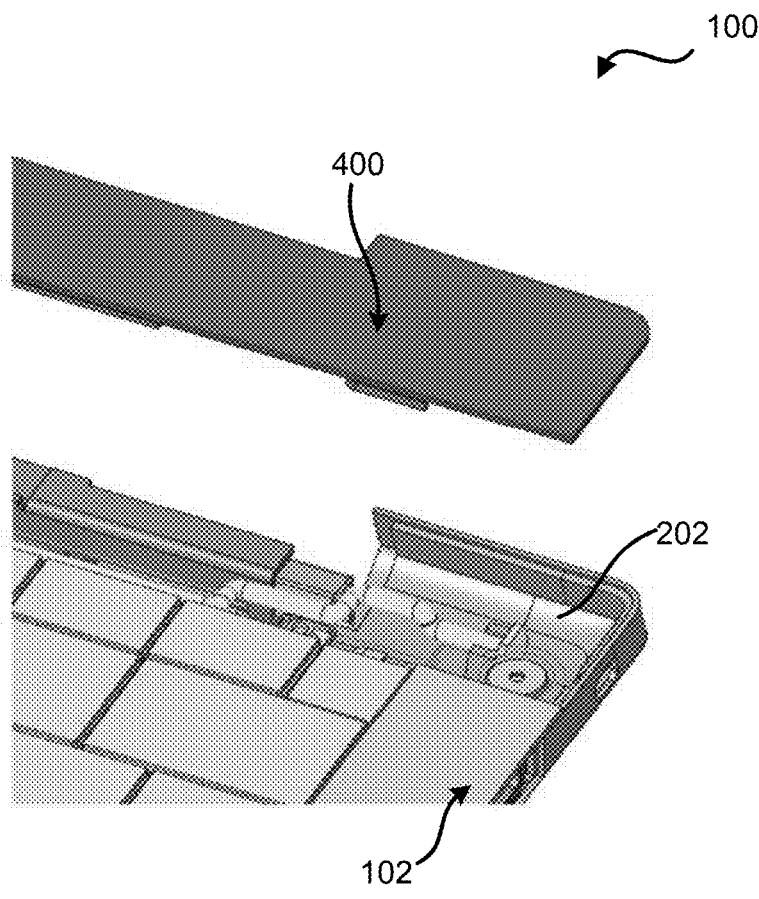
FIG. 12 is a diagram of the cover in a second open position according to at least one embodiment of the present disclosure.

FIG. 12 illustrates information handling system 100 with base cover 400 in the detached position according to at least one embodiment of the present disclosure. As shown in FIG. 12, base cover 400 is no longer in physical communication with chassis base 202 of base portion 102. When base cover 400 is not in physical communication with chassis base 202, the base cover is in the detached position.

Figure 13:
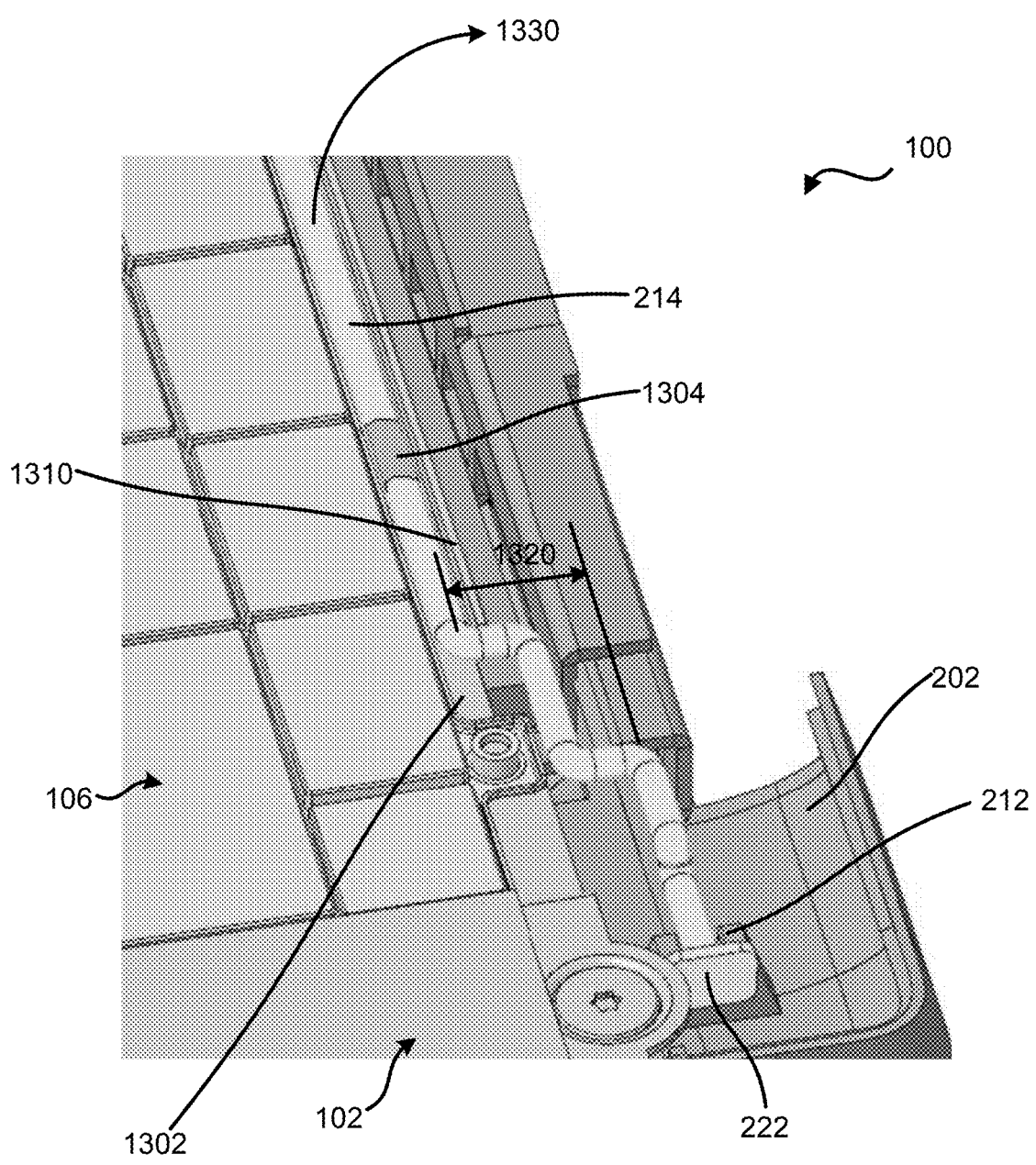
FIG. 13 is a diagram of a lock bar in a locked position according to at least one embodiment of the present disclosure.
Figure 14:
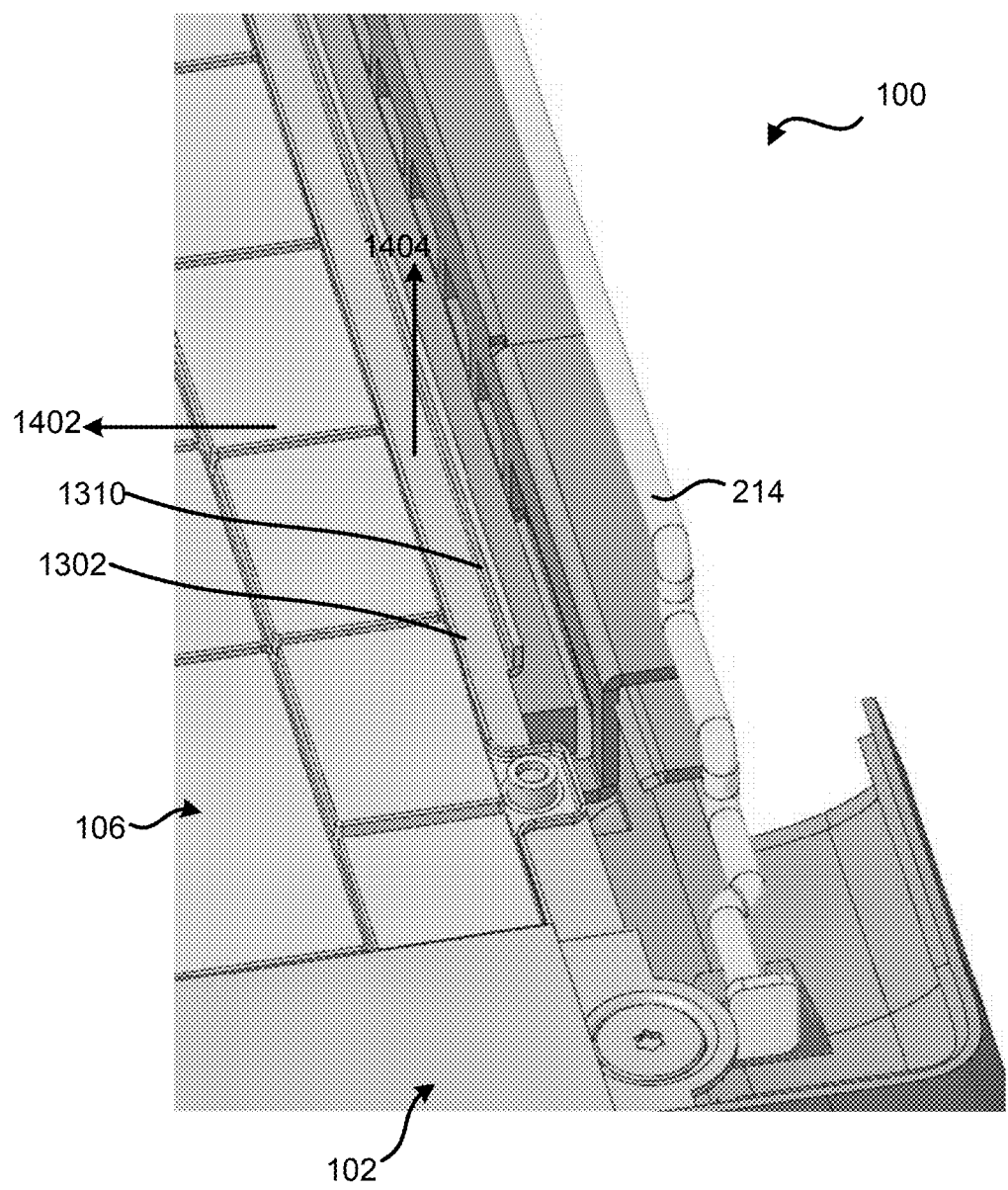
FIG. 14 is a diagram of the lock bar in an unlocked position according to at least one embodiment of the present disclosure.

FIGS. 13 and 14 illustrate a portion of information handling system 100 according to at least one embodiment of the present disclosure. Information handling system 100 includes a c-cover 1302 and a low friction sleeve 1304. C-cover 1302 includes a back wall 1310 and may include the portion of base portion 102 that includes keyboard 106. Information handling system 100 may include additional components without varying from the scope of this disclosure.

In an example, when lock bar 214 is in the closed position, a portion of lock bar 214 that includes low friction sleeve 1304 may be located in physical communication with c-cover 1302 in front of back wall 1304. In certain examples, keyboard 106 may be a drop-and-slide keyboard, such that c-cover 1302 and the keyboard may slide in and out of a locked position of base portion 102. In an example, lock bar 214 may hold keyboard 106 in place and prevent the keyboard from be removed from base portion 102. For example, the location of lock bar 214 in physical communication with both c-cover 1302 and back wall 1310 may prevent the c-cover and keyboard 106 from sliding out of base portion 102.

In an example, low friction sleeve 1304 may allow lock bar 214 to slide across c-cover 1302 while the lock bar transitions between the unlocked and locked positions. For example, low friction sleeve 1304 may reduce an amount of force needed to be exerted against head 222 until the head is in physical communication with lock bar chassis support 212. In certain examples, portions of lock bar 214 may be offset by an amount 1320 from lock bar chassis support 212. In an example, offset 1320 may enable lock bar to transition between the locked and unlocked positions with hitting against the rear wall of chassis base 202. Additionally, offset 1320 may also enable lock bar 214 to rotate in the direction of arrow 1330 without interfering with the rear wall of chassis base 202. In an example, the rotation of lock bar 214 in the direction of arrow 1330 may transition the lock bar from a closed position to an open position.

FIG. 14 illustrates a portion of information handling system 100 with lock bar 214 in the open position according to at least one embodiment of the present disclosure. When lock bar 214 is in the open position, the lock bar is not in physical communication with c-cover 1302 and back wall 1310. In response to lock bar 214 being in the open position, keyboard 106 may slide in the direction of arrow 1402 and/or be lifted in the direction of arrow 1404. Based on the movement of keyboard 106 in the direction of arrow 1402 and/or the direction of arrow 1404, the keyboard may be removed from base portion 102.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a base portion including:
a first lock bar chassis support located near a first edge of the base portion; and
a second lock bar chassis support located near a second edge of the base portion; and
a lock bar in physical communication with the first and second lock bar chassis supports, the lock bar including:
a first head located at a first end of the lock bar, wherein the first head is in physical communication with the first lock bar chassis support when the lock bar is in a locked position, and the first head is not in physical communication with the first lock bar chassis support when the lock bar is in an unlocked position; and
a second head located at a second end of the lock bar, wherein the second head is in physical communication with the second lock bar chassis support when the lock bar is in the unlocked position, and the second head is not in physical communication with the second lock bar chassis support when the lock bar is in the locked position.

2. The information handling system of claim 1, further comprising: a base cover in physical communication with the base portion, wherein the base cover is held in a closed position when the lock bar is in the locked position, and wherein the base cover transitions to an open position when the lock bar is in the unlocked position.

3. The information handling system of claim 2, wherein the base cover translates away from a c-cover of the information handling system to move from the closed position to the open position.

4. The information handling system of claim 2, wherein the base cover includes: a flange in physical communication with the lock bar when the lock bar is in the locked position, and wherein the flange is not in physical communication with the lock bar when the lock bar is in the unlocked position.

5. The information handling system of claim 4, wherein the physical communication between the flange and the lock bar prevent the base cover from translating away from a c-cover of the information handling system to move from the closed position to the open position when the lock bar is in the locked position.

6. The information handling system of claim 2, wherein the base cover includes a hook in physical communication with the base portion when the base cover is in the closed position, wherein the hook prevents the base cover from being lifting up from the base portion when the base cover is in the closed position.

7. The information handling system of claim 6, wherein the hook is not in physical communication with the base portion when the base cover is in the open position.

8. The information handling system of claim 1, further comprising: a c-cover in physical communication with the base portion, wherein the c-cover is in physical communication with the lock bar when the lock bar is in a closed position, and wherein the c-cover is not in physical communication with the lock bar when the lock bar is in an open position.

9. An information handling system comprising:
a base portion including:
a first edge having a first hole to receive a locking tool;
a second edge having a second hole to receive the locking tool;
a first lock bar chassis support located near the first edge; and
a second lock bar chassis support located near the second edge; and
a lock bar in physical communication with the first and second lock bar chassis supports, the lock bar including:
a first head located at a first end of the lock bar, wherein based on a first force from the locking tool through the first hole the lock bar is placed in a locked position, wherein the first head is placed in physical communication with the first lock bar chassis support when the lock bar is in the locked position, and the first head is not in physical communication with the first lock bar chassis support when the lock bar is in an unlocked position; and
a second head located at a second end of the lock bar, wherein based on a second force from the locking tool through the second hole the lock bar is placed in an unlocked position, wherein the second head is placed in physical communication with the second lock bar chassis support when the lock bar is in the unlocked position, and the second head is not in physical communication with the second lock bar chassis support when the lock bar is in the locked position.

10. The information handling system of claim 9, further comprising a base cover in physical communication with the base portion, wherein the base cover is held in a closed position when the lock bar is in the locked position, and wherein the base cover transitions to an open position when the lock bar is in the unlocked position.

11. The information handling system of claim 10, wherein the base cover translates away from a c-cover of the information handling system to move from the closed position to the open position.

12. The information handling system of claim 10, wherein the base cover includes a flange in physical communication with the lock bar when the lock bar is in the locked position, and wherein the flange is not in physical communication with the lock bar when the lock bar is in the unlocked position.

13. The information handling system of claim 12, wherein the physical communication between the flange and the lock bar prevent the base cover from translating away from a c-cover of the information handling system to move from the closed position to the open position when the lock bar is in the locked position.

14. The information handling system of claim 10, wherein the base cover includes a hook in physical communication with the base portion when the base cover is in the closed position, wherein the hook prevents the base cover from being lifting up from the base portion when the base cover is in the closed position.

15. The information handling system of claim 14, wherein the hook is not in physical communication with the base portion when the base cover is in the open position.

16. The information handling system of claim 9, further comprising: a c-cover in physical communication with the base portion, wherein the c-cover is in physical communication with the lock bar when the lock bar is in a closed position, and wherein the c-cover is not in physical communication with the lock bar when the lock bar is in an open position.

17. An information handling system comprising:
a base portion including:
    a first lock bar chassis support located near a first edge of the base portion; and
    a second lock bar chassis support located near a second edge of the base portion;
a lock bar in physical communication with the first and second lock bar chassis supports, the lock bar includes:
    a first head located at a first end of the lock bar, wherein the first head is in physical communication with the first lock bar chassis support when the lock bar is in a locked position, and the first head is not in physical communication with the first lock bar chassis support when the lock bar is in an unlocked position; and
    a second head located at a second end of the lock bar, wherein the second head is in physical communication with the second lock bar chassis support when the lock bar is in an unlocked position, and the second head is not in physical communication with the second lock bar chassis support when the lock bar is in the locked position;
a base cover in physical communication with the base portion, wherein the base cover is held in a closed position when the lock bar is in an the unlocked position, and wherein the base cover transitions to an open position when the lock bar is in the unlocked position; and
a c-cover in physical communication with the base portion, wherein the c-cover is in physical communication with the lock bar when the lock bar is in a closed position, and wherein the c-cover is not in physical communication with the lock bar when the lock bar is in an open position.

18. The information handling system of claim 17, wherein base cover includes: a flange in physical communication with the lock bar when the lock bar is in the locked position, and wherein the flange is not in physical communication with the lock bar when the lock bar is in the unlocked position.

19. The information handling system of claim 17, wherein the base cover includes a hook in physical communication with the base portion when the base cover is in the closed position, wherein the hook prevents the base cover from being lifting up from the base portion when the base cover is in the closed position.

20. The information handling system of claim 19, wherein the hook is not in physical communication with the base portion when the base cover is in the open position.

* * * * *